Nov. 24, 1964  A. CROFT ETAL  3,158,243
MAGNETIC CLUTCHES AND BRAKES
Filed Nov. 28, 1960  2 Sheets-Sheet 1
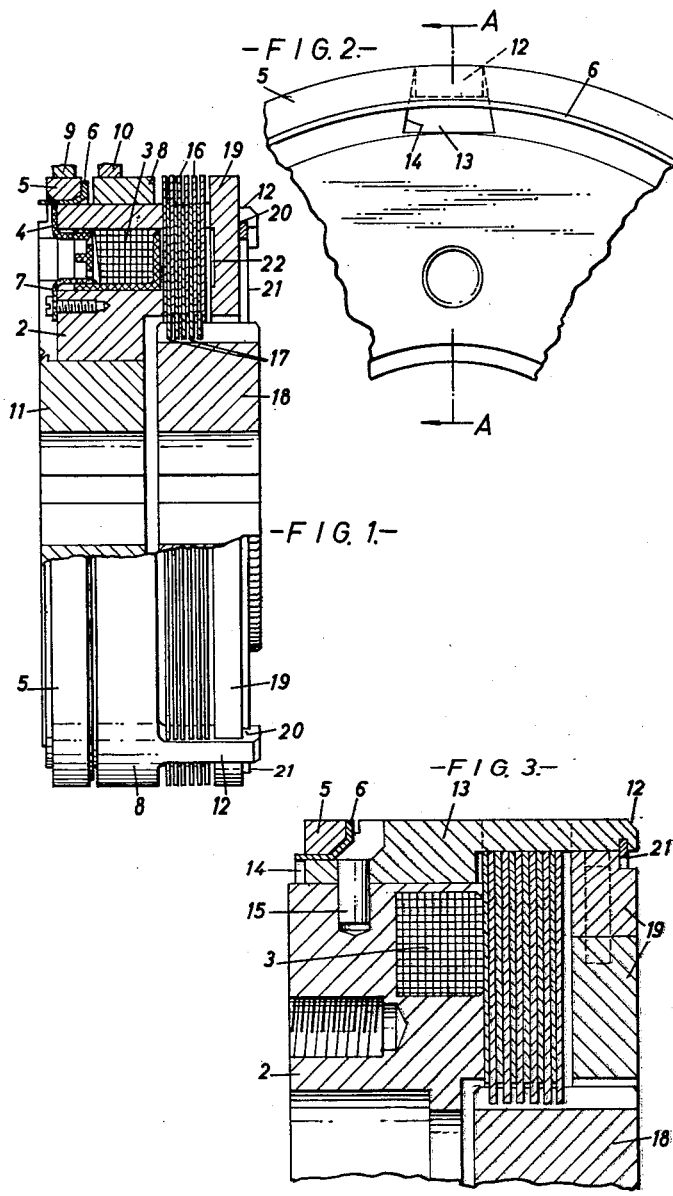

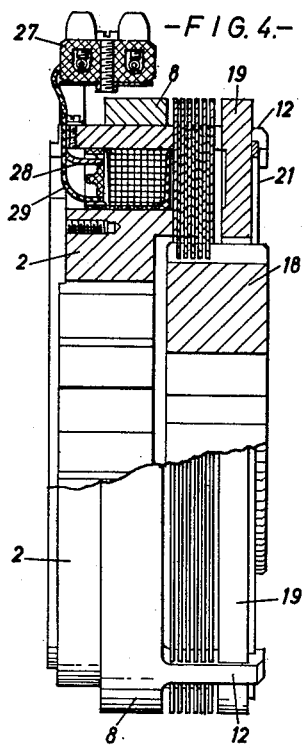
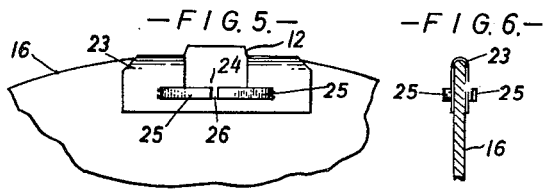
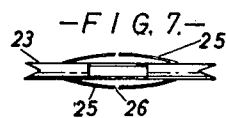

United States Patent Office 3,158,243
Patented Nov. 24, 1964

3,158,243
MAGNETIC CLUTCHES AND BRAKES
Arthur Croft, Rawdon, and Edwin Whiteley, Eccleshill, Bradford, England, assignors to Crofts (Engineers) Limited, Bradford, England, a British company
Filed Nov. 28, 1960, Ser. No. 72,214
Claims priority, application Great Britain, Dec. 8, 1959, 41,677/59
4 Claims. (Cl. 192—84)

This invention relates to electro-magnetic plate friction couplings such as clutches and brakes and of the type wherein a magnetic field can be created to flow parallel with the axis of the clutch or brake and in two directions through the plates.

Various types of clutches are known wherein an exciter coil is contained in a body adjacent which is located a pack of plates with one set in driving connection with the body and the other having internal driven connection with some element such as a sleeve, boss, hub or the like, and a closing plate forming an armature is restrained on one side of the pack of plates. Thus when the coil is excited magnetic flux flows through the body, the pack of plates into the armature and back through the plates into the body in what may be termed a substantially rectangular circuit. In this manner sufficient power can be generated in the form of magnetic attraction to cause the closing plate and the pack of plates to close together towards the body to give substantially powerful friction driving connection through the two clutch parts. In some cases these clutches are the so-called stationary field type and in the other cases slip ring type.

The main object of the present invention is to provide an improved unitary magnetic clutch or brake.

Accordingly there is provided a magnetic clutch or brake including a body containing an exciter coil, a closing plate forming an armature, an interposed pack of at least two separable friction plates having one half of the pack in driving connection with the body through fingers projecting co-axially from the body, and the other pack half in driving connection with a shaft driven member, said closing plate serving to determine the amount of air gap between the plates and being co-axially mounted about said member with clearance and gapped at its peripheral edge for said fingers to project therethrough, the plate being restrained in relation to the body from outward axial movement by removable retaining means interengaged with the fingers, whereby at least the main clutch or brake parts are releasably held together as a unit. The retaining means may be a spring ring.

The fingers may be integral with or secured to the body. In the latter instance the fingers may be dovetailed into the periphery of the body and secured.

With the improved clutch construction a slip ring may be mounted about the body and a return ring provided in electrical connection with the body to enable two brushes to be associated with the clutch for electrical input and return. Moreover, resilient means may be furnished for separating the plates when the coil is de-energised.

The invention will now be more particularly described with reference to the accompanying drawings, in which:

FIG. 1 is a part sectional elevation of an improved magnetic clutch;

FIG. 2 is a detailed part view of a modified retaining finger mounting;

FIG. 3 is a sectional elevation on line A—A of FIG. 2;

FIG. 4 is a part sectional elevation of an improved magnetic brake;

FIG. 5 is an elevation of a plate separating spring element;

FIG. 6 is an end view of FIG. 5; and

FIG. 7 is a plan view of FIG. 5.

In a particular embodiment of this invention as shown in FIG. 1, a slip ring type of clutch is constructed including a body part 2, usually magnetic iron, adapted to contain an exciter coil 3 which is electrically connected by a lead 4 to a slip ring 5 mounted about the periphery of the body and insulated therefrom by the insulating ring 6. The coil 3 has a further lead 7 to the body. This body is also furnished with a firm fitted ring 8 about its periphery adjacent the slip ring 5 to form a return or earthing ring and thus, when desired, two brushes 9, 10 may furnish electrical connection with the coil and body respectively for electrical input and return. Conveniently the said body is in driving connection with, say splined on to, a bush 11 adapted to be mounted on a shaft to be driven.

The aforesaid body 2 is furnished with a series of fingers 12 projecting from one face thereof co-axially and these fingers are integral with the body, although they may be detachably mounted. For example, as shown in FIGS. 2 and 3, the inner ends 13 of the fingers are of dovetailed formation to be forced longitudinally into dovetailed grooves 14 in the periphery of the body and such fingers may then be pinned at 15 or otherwise secured.

The above fingers 12 form the driving connection between the body 2 and so-called annular outer plates 16 of a pack of annular plates, such plates 16 being gapped radially in their peripheral edges in known manner to engage the fingers. The remaining annular plates 17 of the pack are gapped radially or toothed internally to have driving connection with a driven element, such as a hub 18, to be mounted on a driving shaft. The said pack of plates 16, 17 have an associated annular closing plate 19 which forms an armature and serves to determine the amount of air gap between the plates. This plate is also gapped radially at its periphery so that the body fingers 12 project therethrough and beyond its outer face a required distance. A groove 20 is formed internally in the fingers for the introduction of a spring ring 21, such as a circlip, and this will restrain the closing plate 19 from outward movement. The closing plate is mounted about the aforesaid driven hub 18 with clearance and thus is free for axial movement inwardly during clutch operation and the only frictional resistance can be between the plate and fingers. The inner face of this plate has an annular recess 22 to ensure true bedding of the plate against the adjacent friction plate 16.

Resilient means, not included in FIG. 1, may be furnished for causing separation of the plates 16, 17 when the coil is de-energised and conveniently spring elements may be spaced about the periphery of selected plates. For example, as shown in FIGS. 5 to 7, each spring element 23 is a thin plate of spring steel folded together about its longitudinal centre and, when so folded (in side view FIG. 6) is of U-formation, with a gap 24 from the folded edge for it to be engaged with a body finger 12 to prevent its movement about the periphery of a plate 16 on to the edge of which it has been located.

The spring means proper comprise a small outwardly arched strip 25 on each face of the element and to ensure true flexion each strip may be separated from the element at one end, or alternatively, as shown, split or gapped at its centre 26.

The aforesaid clutch construction can readily be modified to form a magnetic brake as shown in FIG. 4. All the parts are of almost identical construction as the clutch with the exception that the slip ring 5 and ring 6 are dispensed with and a terminal block 27 provided for electrical connection by leads 28, 29 to the exciter coil 3. Also, the body is shown splined, or it may have a keyway, to be mounted on a shaft or other member.

What we claim is:

1. In a magnetic coupling such as a clutch or brake, the combination comprising a rotatable body of magnetic material connectible to a driving member, so as to be rotated, and exciter coil mounted on said body of magnetic material, a plurality of fingers secured to and projecting co-axially from said body and distributed around the periphery thereof in spaced relation, a driven member mounted co-axially with said driving member, an annular closing plate of magnetic material forming an armature and which surrounds said driven member, a pack of separable friction plates interposed between said closing plate and said body of magnetic material and through which the magnetic field passes, said plate pack being comprised of one group of alternate plates arranged to be driven by said fingers and a second group of alternate plates arranged in driving relation to said driven member, said closing plate serving to determine the amount of the air-gap between said plates and being provided with circumferentially spaced slots through which said fingers project, and a removable retaining spring ring secured by and located between the outer ends of said fingers and the corresponding side of said closing plate for restraining said closing plate against axial movement in a direction away from said body of magnetic material whereby the main parts of said coupling are releasably held together as a unit.

2. A magnetic coupling as defined in claim 1 wherein the outer end of each said finger is provided with a groove, said grooves being in axial alignment to establish a seat for receiving said retaining ring.

3. A magnetic coupling as defined in claim 1 and which further includes resilient means for separating said two groups of friction plates when said exciter coil is de-energized, said resilient means being constituted by folded spring elements with arched spring side strips, said spring elements being located on and embracing the outer edge portions of some of said plates and being engaged with said fingers.

4. A magnetic coupling as defined in claim 1 and wherein said fingers have dovetail portions fitted into correspondingly dovetailed recesses in the periphery of said body of magnetic material.

References Cited by the Examiner

UNITED STATES PATENTS

| | | |
|---|---|---|
| 942,867 | 12/09 | Ravenshaw. |
| 2,057,876 | 10/36 | Berry. |
| 2,209,776 | 7/40 | Kiekhaifer. |
| 2,254,625 | 9/41 | Ryba. |
| 2,600,520 | 6/52 | Spase _____ 192—69 |
| 2,779,448 | 1/57 | Lambach et al. |
| 2,861,664 | 11/58 | Simon et al. |
| 2,862,590 | 12/58 | Schuman. |
| 2,936,053 | 5/60 | Reucker _____ 192—84 |
| 2,945,573 | 7/60 | Wiedmann. |
| 2,998,877 | 9/61 | Ryba _____ 192—84 |
| 3,037,601 | 6/62 | Binder _____ 192—84 |

FOREIGN PATENTS

| | | |
|---|---|---|
| 1,177,741 | 12/58 | France. |
| 645,029 | 5/37 | Germany. |
| 614,913 | 12/48 | Great Britain. |
| 501,580 | 11/54 | Italy. |

DAVID J. WILLIAMOWSKY, *Primary Examiner.*

THOMAS J. HICKEY, *Examiner.*